J. T. CANTRELL.
VEHICLE BODY.
APPLICATION FILED NOV. 15, 1919.

1,417,140.

Patented May 23, 1922.
2 SHEETS—SHEET 1.

WITNESSES
Frederick Diehl.
A. L. Kitchin

INVENTOR
JOSEPH T. CANTRELL.
BY
ATTORNEYS

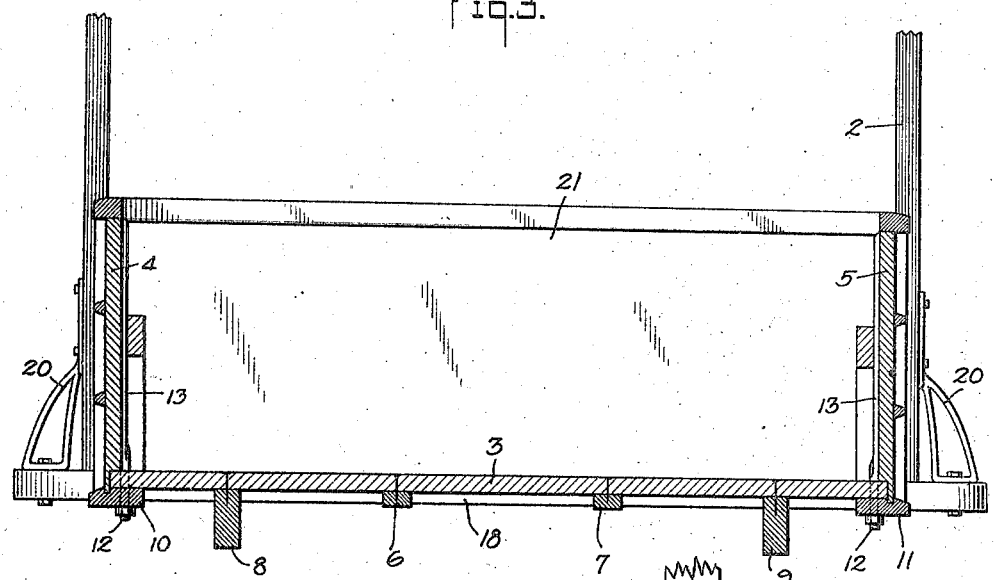
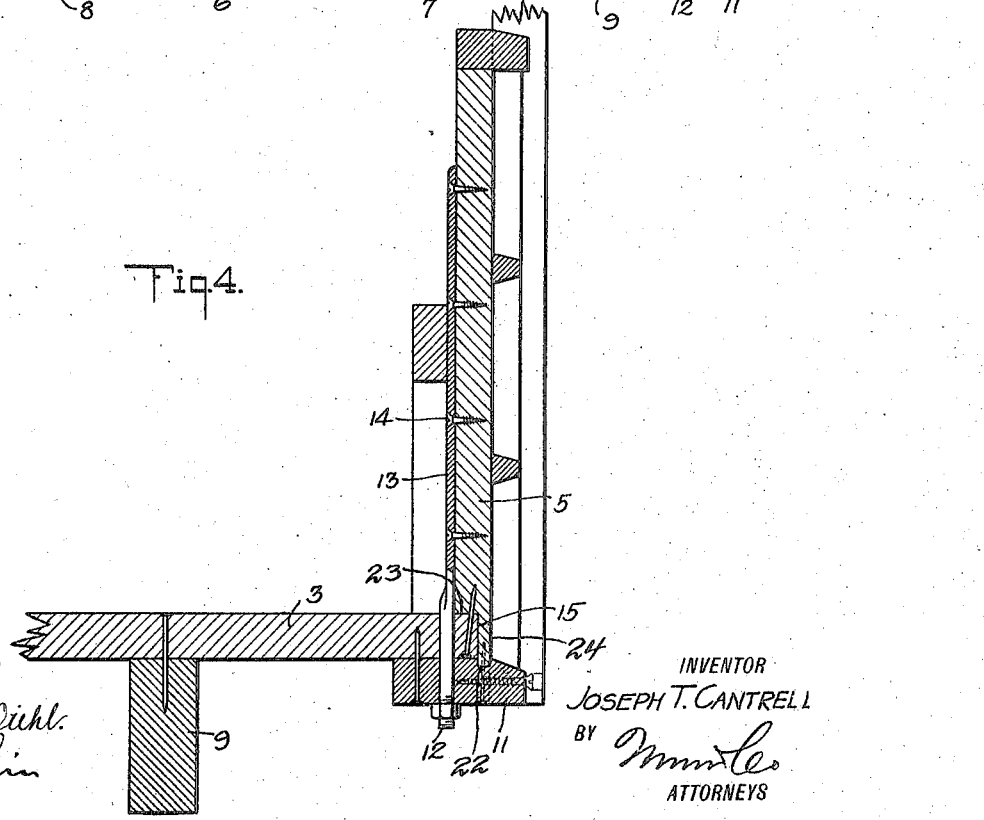

UNITED STATES PATENT OFFICE.

JOSEPH THEODORE CANTRELL, OF HUNTINGTON, NEW YORK, ASSIGNOR TO J. T. CANTRELL & COMPANY, OF HUNTINGTON, NEW YORK, A COPARTNERSHIP.

VEHICLE BODY.

1,417,140.            Specification of Letters Patent.     Patented May 23, 1922.

Application filed November 15, 1919. Serial No. 338,173.

*To all whom it may concern:*

Be it known that I, JOSEPH T. CANTRELL, a citizen of the United States, and a resident of Huntington, in the county of Suffolk and State of New York, have invented a new and useful Vehicle Body, of which the following is a full, clear, and exact description.

This invention relates to vehicle bodies, and particularly to an improved body for commercial vehicles, for instance a commercial automobile, and has for an object to provide an improved construction wherein the side walls or boards and the bottom boards are connected by a joint which is very strong and durable and not liable to give way or open under the severest strains to which the same may be subjected while in use.

In the accompanying drawings:

Figure 3 is a section through Figure 1 on line 3—3, the same being on an enlarged scale.

Figure 4 is an enlarged detail fragmentary sectional view through Figure 1 on line 4—4.

Figure 1:
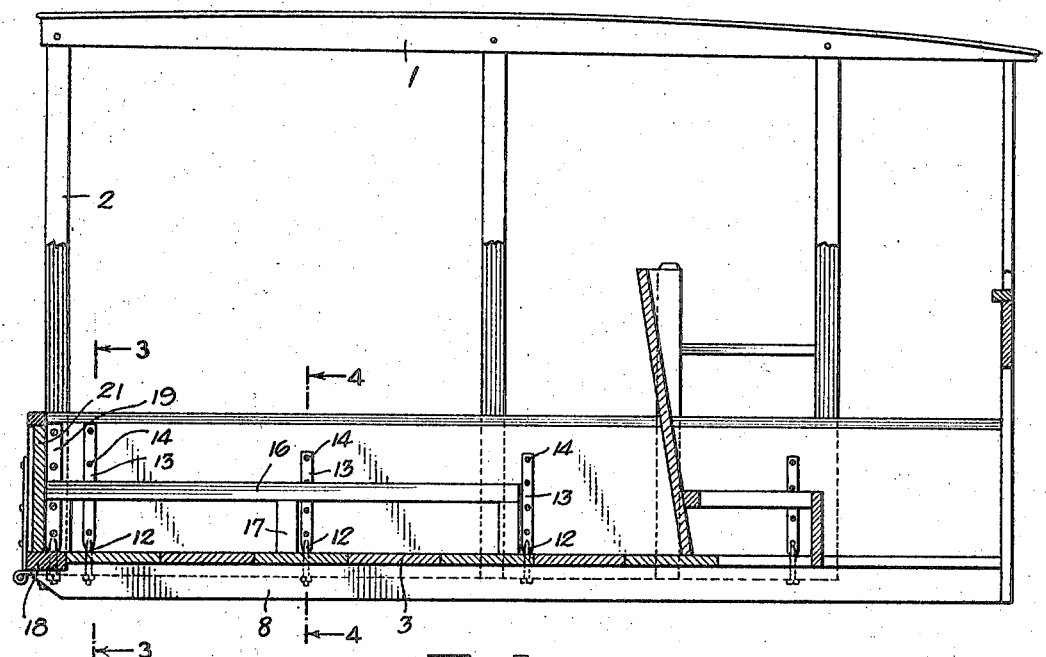
Figure 1 is a side view of a body disclosing an embodiment of the invention, the lower part of the body being broken away for better illustrating the construction.

In the construction of commercial bodies for automobiles usually two supporting beams are provided which carry the entire load, including the load of the body as well as the load placed on the body. In order to properly support these two loads the beams must be extra size and extra strong. Where a light body is used extra heavy beams cannot be utilized, and consequently the light bodies are comparatively weak. To obviate this means have been provided in the present invention whereby a maximum strength is secured by using beams substantially in the ordinary manner, and in addition by utilizing the strength of the sides of the body and associate parts.

In the accompanying drawings 1 indicates the top of a commercial body for an automobile, said top being supported by suitable uprights 2 which are bolted, screwed, or otherwise fastened in place, not only in connection with the top 1, but with the bottom boards 3 and side boards 4 and 5. The bottom boards 3 extend transversely as shown in Figure 4, and are secured in any side manner with the floating beams 6 and 7 into the main supporting beams 8 and 9, said last mentioned beams extending for preferably the full length of the body. Incidentally it will be noted that the front part of the body is made so as to be readily placed upon a chassis of an automobile. Where the body is to be used for carrying light and heavy loads, the beams 8 and 9 are not sufficiently strong to give the desired support with any assurance. To assist supporting the bottom boards 3 the side boards 4 and 5 are connected to these bottom boards through longitudinally arranged strips 10 and 11 engaging the under side of the boards 3. These strips are supported by having a number of bolts 12 extend therethrough, with the upper ends flattened at 13 for receiving screws 14 which extend through the flattened or strapped end of the bolts and into the side boards 4 and 5. In this way any downward pressure on the boards 3 will not only be exerted against the beams 8 and 9, but also against the strips 10 and 11, and the strain on the strips 10 and 11 will be communicated through the bolts 12 to the side boards 4 and 5. As these side boards are arranged edgewise and pressed into position they will act as auxiliary beams as well as side boards.

Figure 2:
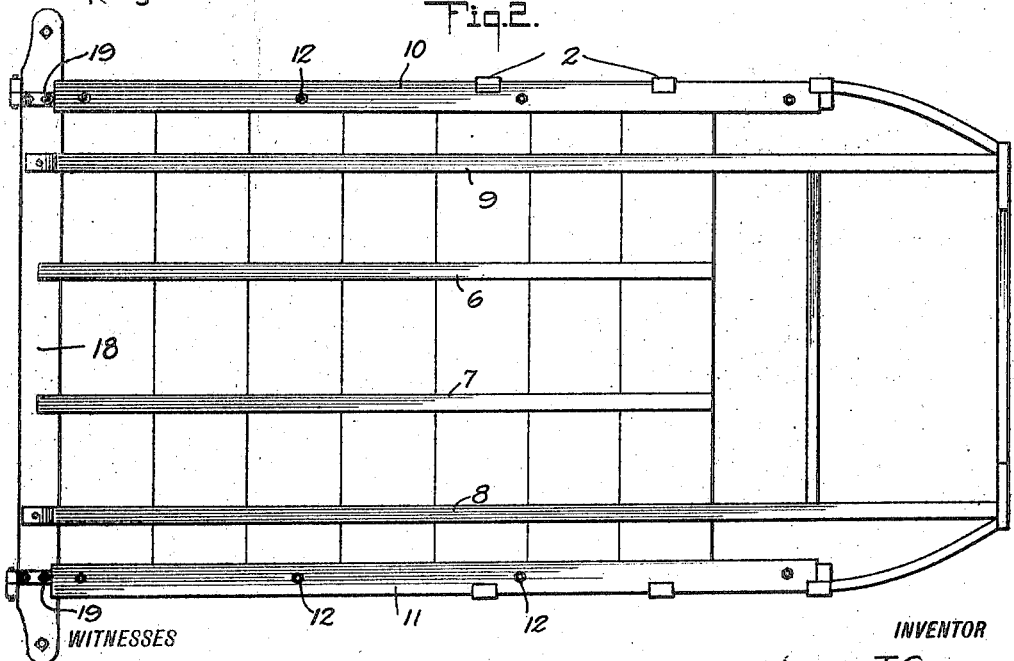
Figure 2 is a bottom plan view of the body shown in Figure 1.

In order to provide a neat and strong connection between the bottom boards 3 and the side boards, the boards 3 are set into the side boards as shown in Figure 4. In this figure the side board 5 is notched or rabbeted as shown at 15 for receiving the end of board 3, while the extreme lower edge of the board 5 fits into a longitudinal groove 22 in the upper side of the strip 11. By this means the rabbet 15 forms a downwardly facing shoulder 23 on the side board which engages with the upper side of the bottom board, and also a reduced tongue 24 which projects downwardly below the bottom board and is received in the groove 22 in the strip 11 engaging with the underside of the bottom board. The strip 11 extends preferably beyond the board 5 and is notched at proper places for receiving the various uprights 2, which are held in place by screws or otherwise as desired. In the drawing a seat receiving runner 16 is provided which is connected in any suitable manner with the sides and is also supported by suitable uprights 17. This runner is to receive seats where the body is used as means for carrying passengers. It will be evident that the body may be used for carrying passengers or merchandise as may be preferred without departing from the spirit of the invention.

Where the body is used for carrying merchandise, especially where the merchandise is loaded on from the rear, a tail bar 18 is especially important. This bar is not only supported by resting on top of the beams 8 and 9, as indicated in Figures 1 and 2, but is also supported by the sides of the body through the action of the straps 19 arranged on each side, and also by the usual bracing brackets 20. The tail board or gate 21 is hinged in a suitable manner to the bar 18. When a barrel or other heavy weight is being loaded it naturally is first placed against the bar 18 and then later pushed into the wagon body. From this it will be seen that the first blow occasioned by the placing of the load in the wagon is taken up by the bar 18 and consequently the arrangement of the same with means for transmitting the strain not only to beams 8 and 9 but to the sides of the body is important.

What I claim is:

In a vehicle body, a bottom, a side board provided on its lower edge with a rabbet receiving the adjacent edge of the bottom and forming a downwardly facing shoulder which engages with the upper side of the bottom and a reduced tongue which projects downwardly beyond the lower side of said bottom, and a strip engaging with the underside of said bottom and provided on its upper side with a groove which receives the lower end of said tongue.

JOSEPH THEODORE CANTRELL.